(12) United States Patent
Prause

(10) Patent No.: US 11,173,814 B2
(45) Date of Patent: Nov. 16, 2021

(54) VEHICLE SEAT COMPRISING FITTING ARRANGEMENT AND LOCKING DEVICE

(71) Applicant: Brose Fahrzeugteile GmbH & Co. Kommanditgesellschaft, Coburg (DE)

(72) Inventor: Markus Prause, Coburg (DE)

(73) Assignee: Brose Fahrzeugteile GmbH & Co. Kommanditgesellschaft, Coburg, Coburg (DE)

(*) Notice: Subject to any disclaimer, the term of this patent is extended or adjusted under 35 U.S.C. 154(b) by 106 days.

(21) Appl. No.: 16/496,106

(22) PCT Filed: Mar. 20, 2018

(86) PCT No.: PCT/EP2018/056992
§ 371 (c)(1),
(2) Date: Sep. 20, 2019

(87) PCT Pub. No.: WO2018/172338
PCT Pub. Date: Sep. 27, 2018

(65) Prior Publication Data
US 2020/0094715 A1      Mar. 26, 2020

(30) Foreign Application Priority Data

Mar. 21, 2017     (DE) .................... 10 2017 204 703.8

(51) Int. Cl.
*B60N 2/433*     (2006.01)
*B60N 2/22*      (2006.01)
*B60N 2/235*     (2006.01)

(52) U.S. Cl.
CPC .......... *B60N 2/433* (2013.01); *B60N 2/2227* (2013.01); *B60N 2/235* (2013.01)

(58) Field of Classification Search
CPC ...... B60N 2/433; B60N 2/2227; B60N 2/235; B60N 2205/50; B60N 2/366
(Continued)

(56) References Cited

U.S. PATENT DOCUMENTS 4,765,681 A * 8/1988 Houghtaling ........ B60N 2/2352
297/367 R
5,507,553 A   4/1996 Nishizawa et al.
(Continued)

FOREIGN PATENT DOCUMENTS

CN       101172465 A    5/2008
CN       101228044 A    7/2008
(Continued)

*Primary Examiner* — Milton Nelson, Jr.
(74) *Attorney, Agent, or Firm* — Brooks Kushman P.C.

(57) ABSTRACT

A vehicle seat, including a seat underframe and a backrest mounted pivotably with respect to the seat underframe about a backrest pivot axis, the inclination of which backrest may be adjusted in a comfort range by pivoting about the backrest pivot axis by a fitting arrangement. The fitting arrangement is provided on a first of two longitudinal backrest sides of the backrest and a locking device is provided remote from the first longitudinal backrest side, which locking device is provided to lock the backrest so as to prevent pivoting about the backrest pivot axis beyond the comfort region in the event of a crash and which is coupled to the fitting arrangement to actuate the locking device when the backrest is actuated beyond the comfort region and to release a locking provided by the locking device by actuating the fitting arrangement.

18 Claims, 12 Drawing Sheets

(58) Field of Classification Search
USPC .................................... 297/216.13, 367 R
See application file for complete search history.

(56) References Cited

U.S. PATENT DOCUMENTS

| | | | |
|---|---|---|---|
| 6,685,270 B2* | 2/2004 | Haglund | B60N 2/20 |
| | | | 297/354.12 |
| 6,789,849 B2* | 9/2004 | Gray | B60N 2/206 |
| | | | 297/367 R |
| 6,923,504 B1* | 8/2005 | Liu | B60N 2/236 |
| | | | 297/367 R |
| 7,168,763 B2* | 1/2007 | Lee | B60N 2/22 |
| | | | 297/232 |
| 8,070,231 B2* | 12/2011 | Kienke | B60N 2/2352 |
| | | | 297/367 R |
| 8,757,717 B2* | 6/2014 | Funk | B60N 2/502 |
| | | | 297/232 |
| 9,399,414 B2* | 7/2016 | Prause | B60N 2/22 |
| 2004/0066079 A1 | 4/2004 | Schwerdtner et al. | |
| 2017/0015221 A1 | 1/2017 | Spangler et al. | |

FOREIGN PATENT DOCUMENTS

| | | |
|---|---|---|
| CN | 102105327 A | 6/2011 |
| DE | 69500344 T2 | 1/1998 |
| DE | 10138200 A1 | 2/2003 |
| DE | 102009056397 A1 | 6/2011 |
| DE | 102011054608 A1 | 4/2013 |
| KR | 20130118983 A | 10/2013 |
| KR | 20160106688 A | 9/2016 |
| WO | 2016196777 A1 | 12/2016 |

* cited by examiner

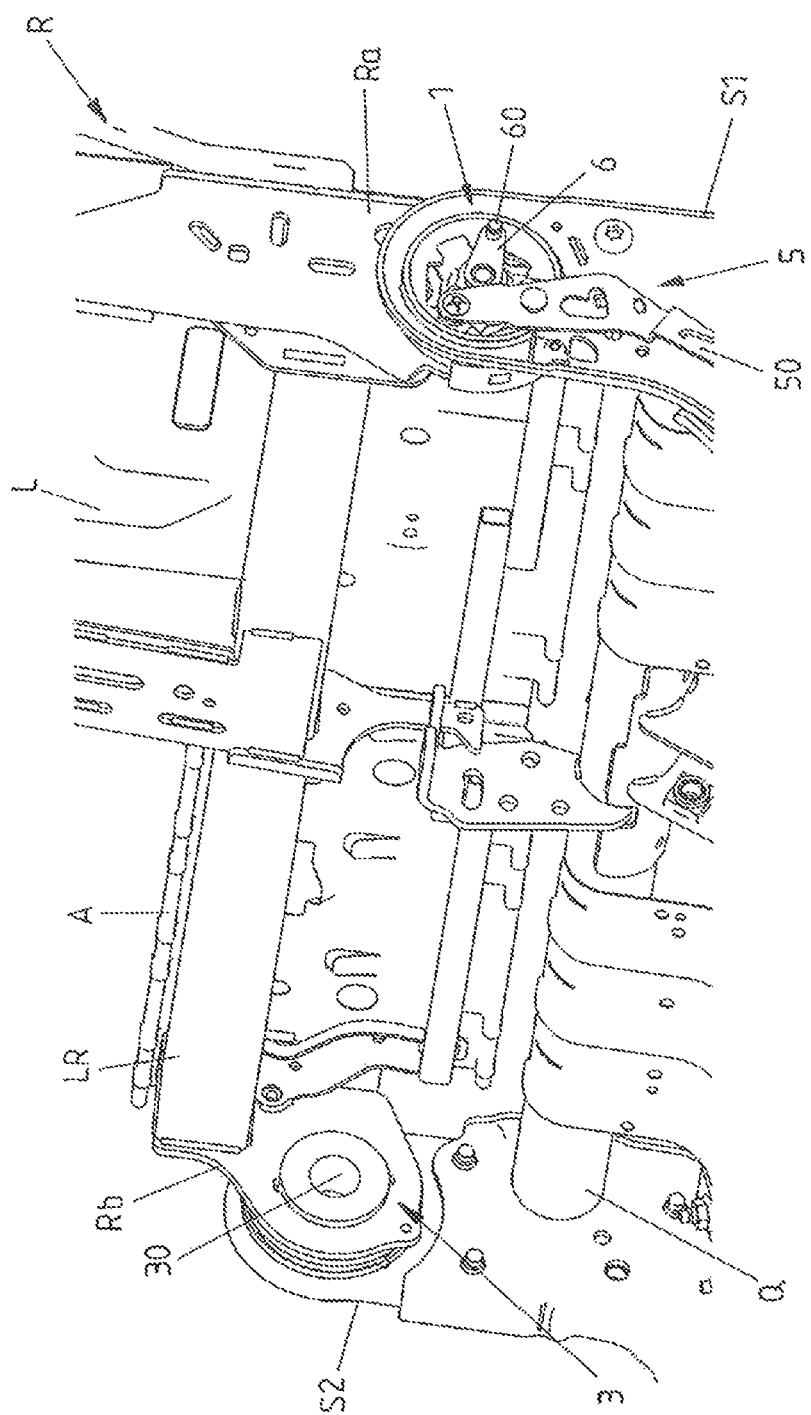

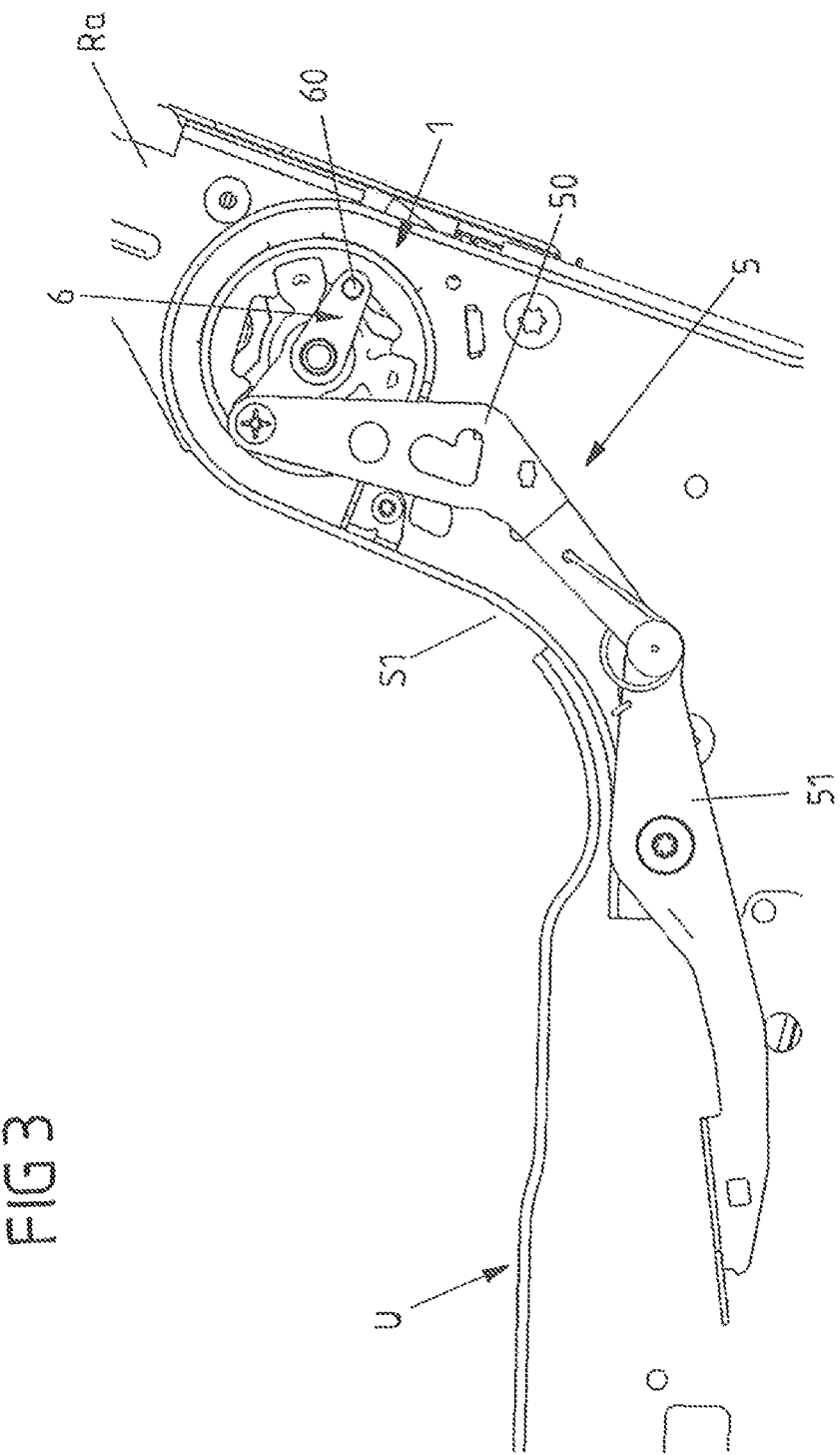

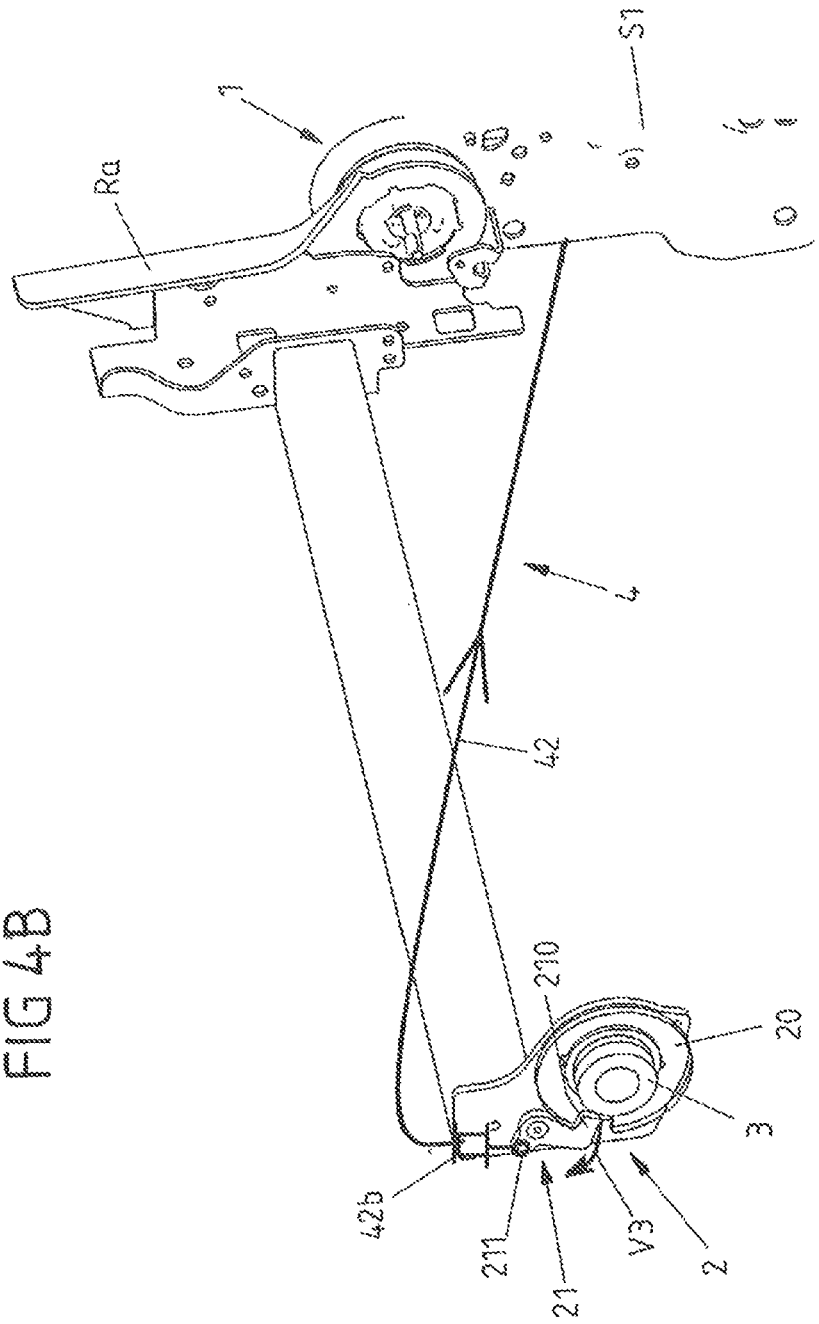

VEHICLE SEAT COMPRISING FITTING ARRANGEMENT AND LOCKING DEVICE

CROSS-REFERENCE TO RELATED APPLICATIONS

This application is the U.S. National Phase of PCT/EP2018/056992 filed Mar. 20, 2018, which claims priority to DE 10 2017 204 703.8 filed Mar. 21, 2017, the disclosures of which are hereby incorporated in their entirety by reference herein.

TECHNICAL FIELD

The present disclosure relates to a vehicle seat having a seat subframe and a backrest pivotally mounted to and relative to the seat subframe about a backrest pivot axis.

BACKGROUND

It is known, on a vehicle seat, for a pivotably mounted backrest to be able to be adjusted in terms of its inclination with respect to the seat subframe. For this purpose, a comfort range is predefined, in which the backrest is, relative to the seat subframe, adjustable into and lockable in different adjustment positions by means of a fitting arrangement. The fitting arrangement may for example comprise a rotary fitting or detent fitting. Here, it is common for fitting arrangements to be provided in each case at both of the longitudinal sides of the backrest, which fitting arrangements are mechanically coupled to one another. Thus, it is for example the case that, by means of the release of the locking at a detent fitting of a first backrest longitudinal side, the detent fitting at the opposite, second backrest longitudinal side is simultaneously also actuated, in order to make it possible for the backrest to be adjusted in terms of its inclination and subsequently arrested again with respect to the seat subframe by means of the two detent fittings.

SUMMARY

One or more objects of the present disclosure may be accomplished by providing an improved vehicle seat provided with a blocking device that may be separately released to fold the backrest forward from the comfort range towards the seat subframe.

According to one or more embodiments, a proposed vehicle seat including a fitting arrangement configured to lock a backrest of the vehicle seat in a comfort range, at a first of two backrest longitudinal sides, whereas a blocking device may be provided opposite the first backrest longitudinal side. The blocking device may be provided for blocking the backrest against pivoting about the backrest pivot axis beyond the comfort range in a crash situation, and may be coupled to the fitting arrangement at the other, first backrest longitudinal side in order, upon an actuation of the fitting arrangement for an adjustment of the backrest beyond the comfort range, to also actuate the blocking device and, by the actuation of the fitting arrangement, release a locking action provided by the blocking device.

According to another embodiment, a fitting arrangement configured to lock a backrest of the vehicle seat in a comfort range, may be provided at only a first of two backrest longitudinal sides, and a blocking device may be provided at the second backrest longitudinal side. An alternative design variant provides two fitting arrangements at two backrest longitudinal sides of the backrest, wherein the blocking device may be provided at a second backrest longitudinal side of the backrest or between the two backrest longitudinal sides. In the latter case, the blocking device may, for example in a crash situation, secure the backrest against pivoting out of the comfort range such that the two fitting arrangements provided do not need to be designed as the sole means for securing the backrest against pivoting in the crash situation. In this way, two fitting arrangements which are undersized for the crash situation and thus less expensive be provided for the crash situation. For example, a blocking device combined with two fitting arrangements may be provided approximately centrally between two backrest longitudinal sides and/or adjacent to a separately pivotable through-loading facility of the backrest.

In this way, upon an actuation of the fitting arrangement in order to adjust the backrest into an adjustment position, in particular into an adjustment position outside the comfort range, the blocking device does not oppose this adjustment, but, when the backrest is situated in the comfort position, the blocking device may secure the backrest against a displacement in a crash situation. The combination of possibly only a single fitting arrangement, which may be provided only at one of two backrest longitudinal sides, with a blocking device at the other backrest longitudinal side, and the coupling thereof to one another, permits not only simple and inexpensive installation but also a relatively high level of operating convenience along with reliable crash safety of the backrest, without the need to provide a second fitting arrangement on the vehicle seat.

In particular in combination with a fitting arrangement which may include a detent fitting, the blocking device provided opposite the first backrest longitudinal side ensures that, in the crash situation, the detent fitting does not undesirably open and thus render the backrest pivotable relative to the seat subframe. Rather, the blocking device provides independent mechanical locking of the backrest to the seat subframe. Nevertheless, the blocking device may be coupled to the fitting arrangement and may be not actuatable independently of the fitting arrangement in order to release the locking. A proposed blocking device thus also specifically differs from a locking mechanism by means of which a pivotable backrest is, independently of a fitting arrangement, secured against being folded forward into a loading position and which must for example firstly be actuated in order to first release a fitting arrangement for the inclination or comfort adjustment of the backrest in order to allow the backrest to be folded forward. By contrast, in the case of the proposed solution, the blocking device that acts for the crash situation when the backrest is situated in the usage position is coupled to the fitting arrangement such that an actuation of the blocking device specifically has to be preceded by an actuation of the fitting arrangement. For a user, an actuation of the fitting arrangement is thus sufficient to pivot the backrest about its backrest pivot axis into an adjustment position situated outside the comfort range, because, upon a corresponding actuation of the fitting arrangement, the locking provided by the separate blocking device which serves as a crash safety means is released.

The backrest may be pivotable about its backrest pivot axis into at least one adjustment position situated outside the comfort range. This is for example a non-use position of the backrest, in which the backrest permits (easier) access to a rear-end load compartment in a motor vehicle, and/or the backrest defines an additional loading surface for the load compartment. Then, as one example, the fitting arrangement at the first backrest longitudinal side is for example also actuatable in order to adjust the backrest into the at least one adjustment position situated outside the comfort range. In this way, by actuation of the fitting arrangement, it is possible for the backrest to not only be adjusted in terms of its inclination within the comfort range but also adjusted into a non-use position.

The fitting arrangement may include a rotary fitting or a detent fitting. In the case of a detent fitting, actuation causes locking of the backrest with respect to the seat subframe to be released. The backrest can then, by means of the detent fitting, be automatically arrested again in an assumed adjustment position as soon as an actuating force (imparted manually or by external force) no longer acts on the detent fitting. In the case of a rotary fitting, a rotational force for pivoting the backrest about its backrest pivot axis can be introduced at the fitting itself. For example, a rotary fitting may include a wobble mechanism for this purpose.

In one design variant, the blocking device may include at least one adjustably mounted blocking element and at least one locking element. Then, for the blocking of the backrest in the comfort range, the at least one blocking element may be lockable by means of the at least one locking element. The adjustably mounted, for example translationally and/or pivotably mounted, blocking element, may be for this purpose adjustable for example between an engagement position and a release position. In the engagement position, the blocking element may be in positive locking engagement with the locking element and, in this way, blocks an adjustment of blocking element and locking element relative to one another. Here, the blocking element may be fixed with respect to the backrest or fixed with respect to the seat subframe, whereas the locking element may be conversely fixed with respect to the seat subframe or fixed with respect to the backrest. Upon an actuation of the fitting arrangement, by means of the coupling to the blocking device, adjustment of the blocking element from the engagement position into the release position occurs. The blocking element and the locking element are consequently disengaged, and blocking of the backrest may be eliminated for as long as the fitting arrangement remains actuated.

Accordingly, in one or more embodiments, actuation of the fitting arrangement may allow the blocking element to be adjustable in order to eliminate locking of the blocking element to the locking element. In particular, in this variant, the blocking element is furthermore not lockable to the locking element if the backrest has been pivoted into an adjustment position outside the comfort range. Outside the comfort range, the blocking device—on in the case of an unactuated fitting arrangement—thus does not oppose a pivoting of the backrest relative to the seat subframe. Locking is permitted only in the comfort range of the backrest in order to thus in a use position of the backrest, in which a seat user can sit on the vehicle seat in the intended manner. Consequently, in this variant, it is only in the comfort range that the backrest is secured by means of the blocking device against underside displacement in the crash situation. For example, on the locking element, there is formed a locking opening into which the adjustable blocking element can engage only in the comfort range of the backrest in order to lock the blocking element to the locking element. Outside the comfort range of the backrest, engagement of the blocking element into the locking element is prevented.

In one or more embodiments, the blocking element may be mounted adjustably on the backrest, for example on a component of a backrest frame, which component is fixed with respect to the backrest, whereas the locking element is fixed to the seat subframe. A reverse arrangement is however self-evidently also possible, such that the blocking element is fixed to the seat subframe and the locking element is fixed to the backrest.

For the coupling of the fitting arrangement at the first backrest longitudinal side to the blocking device opposite the first backrest longitudinal side, for example at the other, second backrest longitudinal side, a coupling mechanism may be provided. The coupling mechanism mechanically transmits an actuating force for actuating the fitting arrangement at least partially as an adjustment force to the blocking device in order to release the latter. Consequently, if a user actuates the fitting arrangement in order, for example, to adjust the backrest in terms of its inclination or in order to pivot the backrest into a non-use position, an adjustment force is also transmitted to the blocking device in order to actuate the latter and eliminate a blocking action by means of the blocking device. In this way, in one variant, upon an actuation of the fitting arrangement, it can also be made possible at all times that the backrest is pivoted into an adjustment position outside the comfort range without the need for the blocking device to be separately actuated additionally to the fitting arrangement.

In one or more embodiments, the coupling mechanism may include at least one flexible traction mechanism for transmitting the adjustment force. This may for example be a cable pull or a Bowden cable. Here, a flexible traction mechanism may for example engage directly on an adjustably mounted blocking element of the blocking device in order to displace the blocking element into a release position, commonly pull the blocking element into a release position, by means of the traction mechanism upon actuation of the fitting arrangement.

In one exemplary embodiment, the flexible traction mechanism extends through a rotary bearing part by means of which the backrest is pivotably mounted, at at least one backrest longitudinal side, on the seat subframe. Here, the rotary bearing part thus defines a physical pivot axis for the backrest, for example at least at the second backrest longitudinal side, at which the blocking device may also be provided. For example, one backrest side part of the backrest is rotatably mounted on the rotary bearing part. By being guided in such a rotary bearing part, the flexible traction mechanism can be routed on the vehicle seat so as to be protected against misuse and external influences.

In one or more embodiments, the vehicle seat may be provided with two fitting arrangements and at least one additional blocking device, it is alternatively or additionally possible for a coupling member which mechanically couples the two fitting arrangements to one another to be part of the coupling mechanism. By means of the coupling member, an actuating force for actuating the fitting arrangement can then be transmitted at least partially both as an adjustment force for actuating the fitting arrangement provided at the other backrest longitudinal side and as an adjustment force for releasing the locking provided by means of the blocking device. Such a coupling member may for example comprise a coupling shaft which extends between the two fitting arrangements.

If the blocking device includes an adjustably mounted blocking element and a locking element that interacts therewith, provision may, in one refinement, be made whereby a rotary bearing part is held in a passage opening of the locking element. For the compact construction, for example at a second backrest longitudinal side which may include the blocking device, or at an approximately centrally provided part of the seat subframe, the locking element provides a passage opening for the attachment of the rotary bearing part, at which passage opening, in turn, a backrest (side) part of the backrest is rotatably mounted. The passage opening for the rotary bearing part may be formed for example centrally on the locking element. The locking element may in particular be of disk-shaped form in this design variant. On a radially outer circumference of a disk-shaped locking element, there is then formed, for example, a locking opening for the positively locking engagement of the blocking element with locking action.

The rotary bearing part may for example be formed of a hollow rotary bearing journal. A hollow rotary bearing journal has not only a weight advantage in relation to a rotary bearing journal composed of a solid material. Rather, a facility for guiding a flexible traction mechanism of the coupling mechanism is also provided by means thereof.

For an actuation of the fitting arrangement, there may be provided on the vehicle seat an actuating mechanism which is coupled to an adjustably mounted release lever which, during an adjustment, effects the actuation of the blocking device. The release lever is thus for example part of the coupling mechanism by means of which an actuating force for actuating the fitting arrangement is at least partially transmitted to the blocking device, or the release lever is mechanically connected to the coupling mechanism. By adjustment of the release lever, locking between a blocking element and a locking element of the blocking device is thus for example released.

For example, the actuating mechanism may include a linkage for the manual actuation of the fitting arrangement. A pivotably mounted release lever may be coupled to the linkage in the region of the fitting arrangement, such that the release lever is jointly adjusted and pivoted upon the actuation of the fitting arrangement. A flexible traction mechanism in the form of a cable pull or Bowden cable is for example then connected to the release lever. Via the traction mechanism, a tensile force is then transmitted to a blocking element at the opposite backrest longitudinal side, for example in the form of a pawl. The traction force leads to the adjustment of the blocking element into a release position, in which the blocking element is no longer in engagement with a locking element of the blocking device.

A fitting arrangement may basically both be actuatable in order to adjust the backrest in the comfort range and actuatable in order to adjust the backrest beyond the comfort range. An actuating mechanism possibly including different actuating elements for an adjustment of the backrest in the comfort range, on the one hand, and an adjustment of the backrest into an adjustment position outside the comfort range, on the other hand. The actuation of a first actuating element, for example in the form of an actuating lever arranged laterally on the vehicle seat, is provided here for adjusting the inclination of the backrest. By means of the actuation of a second actuating element, for example in the form of a further actuating lever provided at an upper end of the backrest, it is possible, by contrast, for a fitting arrangement to be actuated if it is sought for the backrest to be folded forward or back into a non-use position, for example a easy-entry position, table position or a loading position.

In a refinement based on this, provision may also be made whereby the fitting arrangement and the blocking device are coupled to one another to actuate the blocking device only upon an actuation of the fitting arrangement by means of the second actuating element and thus for an adjustment of the backrest into an adjustment position outside the comfort range. A coupling mechanism between the fitting arrangement and the blocking device is thus inactive if the first actuating element is actuated and the backrest is to be adjusted only in the comfort range.

The appended figures illustrate exemplary possible design variants of the proposed solution.

BRIEF DESCRIPTION OF THE DRAWINGS

In the figures:

FIG. 1B shows, in a detail, the vehicle seat from FIG. 1A in a view from the opposite backrest longitudinal side, without the coupling mechanism being illustrated;

FIG. 3 shows, in a side view, the detent fitting with an actuating mechanism for the manual actuation of the detent fitting and of the blocking device;

FIGS. 4A-4B show perspective views, as seen from the two different backrest longitudinal sides, of the only partially illustrated vehicle seat, illustrating an alternatively designed coupling mechanism for the coupling of the detent fitting to the blocking device;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With two fitting arrangements provided at the different backrest longitudinal sides, it is basically necessary to implement measures in order to prevent any malfunctions owing to distortions of the fitting arrangements. Here, the distortion-sensitive installation of the fitting arrangements at the different backrest longitudinal sides generally necessitates relatively cumbersome installation.

In this context, DE 10 2011 054 608 A1 has proposed providing a fitting arrangement only at one backrest longitudinal side of the backrest and, at the opposite backrest longitudinal side, merely mounting the backrest rotatably on a side part of the seat subframe by means of a transverse tube.

Additional securing of the backrest in its upright position within the comfort range, it is furthermore known for blocking devices to be provided on a vehicle seat which block the backrest against pivoting in a crash situation. Such blocking devices commonly comprise elements which are fixed with respect to the backrest and fixed with respect to the seat subframe, which elements are locked to one another and thus secure the backrest against undesired displacement of the backrest relative to the seat subframe even in the presence of the acceleration forces that act in a crash situation. Such blocking devices for crash safety have hitherto commonly been decoupled from the actuation of the fitting arrangements, provided on both sides of the backrest, for the inclination adjustment of the backrest. The blocking device is accordingly separately released if, for example, the backrest is to be folded forward from the comfort range in the direction of the seat subframe into a non-use position.

Figure 1A:
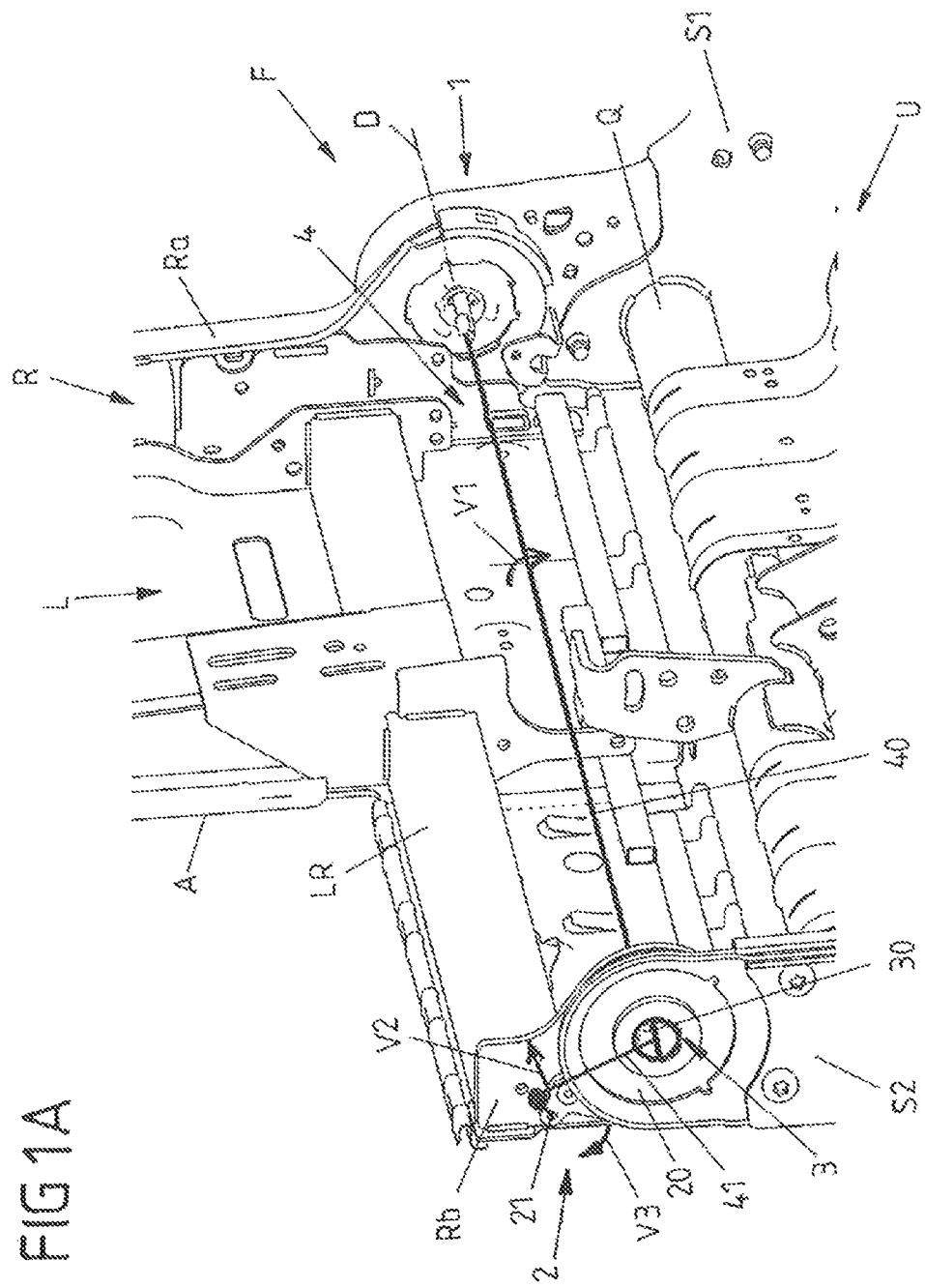
FIG. 1A shows, in a detail, a design variant of a proposed vehicle seat having a detent fitting at one backrest longitudinal side and a blocking device, which may include a pawl, at the other backrest longitudinal side, which detent fitting and blocking device are mechanically coupled to one another by means of a coupling mechanism.

FIGS. 1A and 1B show, in each case in a detail, a vehicle seat having a seat subframe U, on which a backrest R is mounted so as to be pivotable about a backrest pivot axis D. The backrest R is mounted pivotably on opposite side parts S1 and S2 of the seat subframe U at different backrest longitudinal sides. The mounting of the backrest R is realized in the present case above a transverse tube Q of the seat subframe U, which extends between the two side parts S1 and S2. The backrest R is provided in the present case for the rear seat row in a motor vehicle and may include not only an elongate backrest part L for a backrest cushion but also an aperture A, provided adjacent to the backrest part L, for a through-loading facility.

For the pivotable mounting of the backrest R, one (the first, right-hand) side part S1 of the seat subframe U at one (the right-hand) backrest longitudinal side may include a fitting arrangement in the form of a detent fitting 1. On the other (second, left-hand) side part S2 of the other (left-hand) backrest longitudinal side, the backrest R is rotatably mounted without a fitting. The backrest longitudinal sides of the backrest R are defined by the backrest side parts Ra and Rb. By means of the backrest side parts Ra and Rb, which are connected to one another by means of a backrest frame tube LR (as part of the backrest frame), the backrest R is pivotably fixed to the side parts S1 and S2 of the seat subframe U.

Here, by means of the detent fitting 1 at one backrest longitudinal side, the backrest R is adjustable and arrestable, in terms of its inclination with respect to the seat subframe U, in an assumed usage position within a defined comfort range. In order to be able to adjust the inclination of the backrest R, the detent fitting 1 is actuated by means of an actuating mechanism 5. In a manner known per se, the detent fitting 1 then permits pivoting of the backrest R relative to the seat subframe U. When the desired adjustment position has been assumed, a user can release the actuating mechanism 5, such that the detent fitting 1 arrests the backrest in the assumed adjustment position and locks the backrest side part Ra to the side part S1 or to the associated fitting part of the detent fitting 1.

Likewise, by means of the detent fitting 1, pivoting of the backrest R about the backrest pivot axis D toward the seat subframe U into a non-use position is permitted. Accordingly, it is possible, for example by pivoting the backrest R forward beyond the comfort range, for a load compartment in the rear end of the motor vehicle to be made better accessible, or for an additional loading surface to be provided by means of the rear side of the backrest R.

On the vehicle seat F of FIGS. 1A and 1B, no fitting arrangement, and in particular no detent fitting, is provided at the backrest longitudinal side situated opposite the backrest longitudinal side with the detent fitting 1. At the backrest longitudinal side without a fitting, a crash safety means with a blocking mechanism or a blocking device 2 may be provided, which blocks the backrest R against pivoting beyond the comfort range in a crash situation. The blocking device 2 thus secures the backrest R in an upright position and thus in a use position relative to the seat subframe U independently of the detent fitting 1.

Figure 2A:
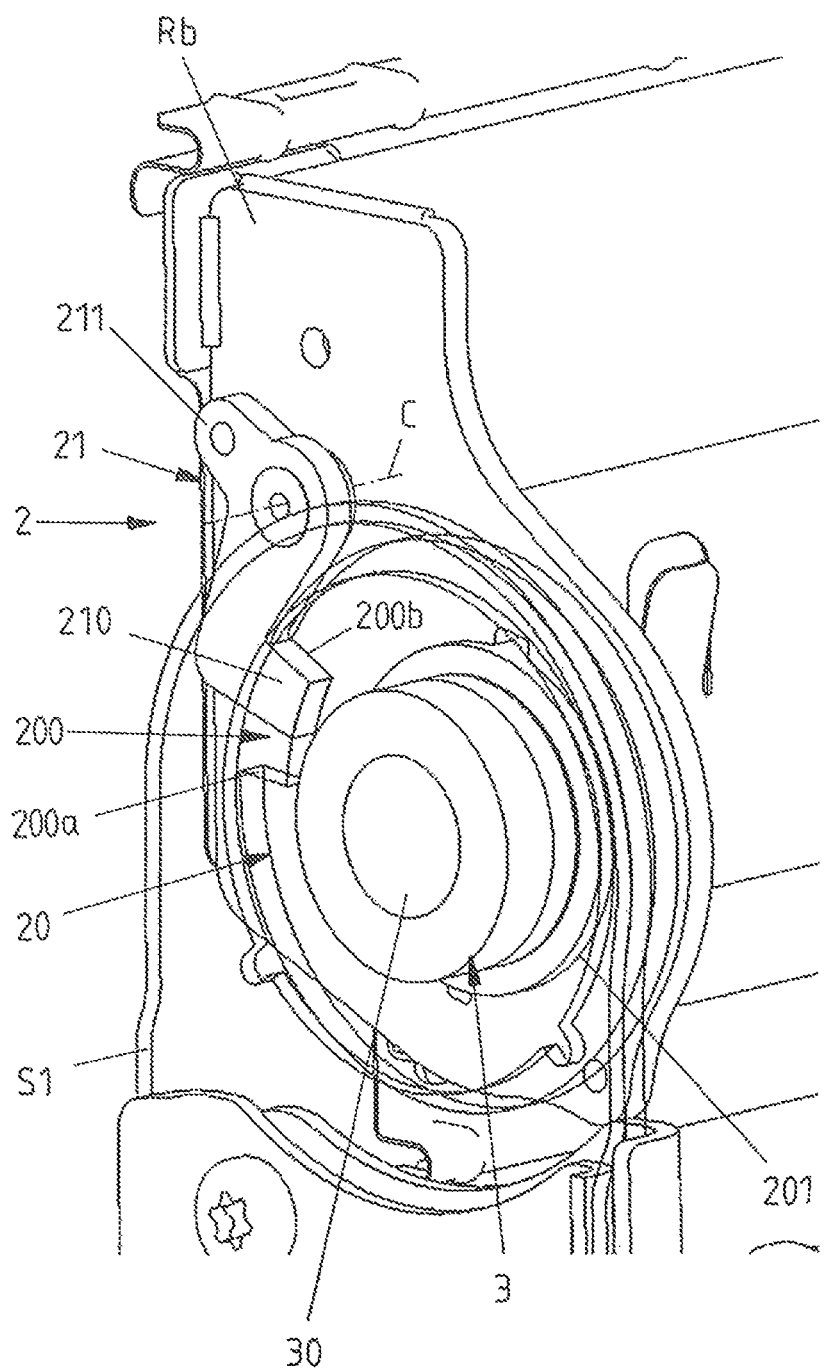
FIGS. 2A-2B show the blocking device of the vehicle seat in a perspective and partially sectional view and in a side view.
Figure 2B:
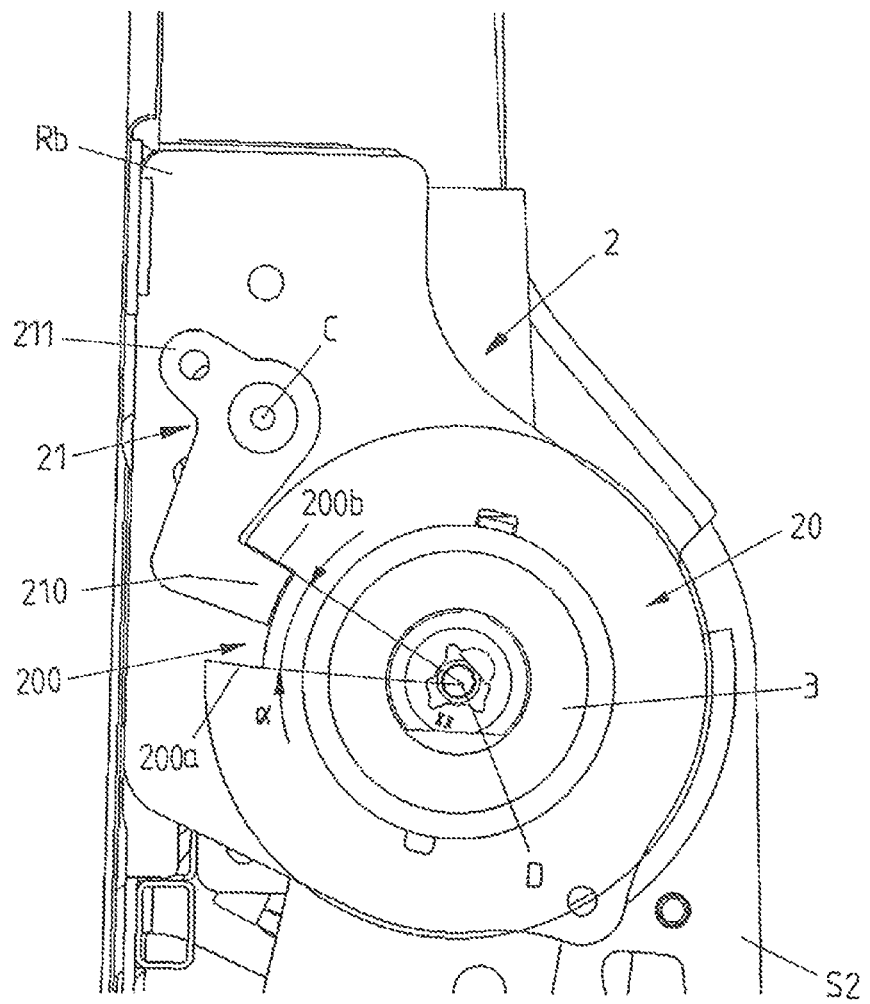

Here, the blocking device 2 may include a blocking element in the form of a pawl 21 and a locking disk 20, into which the pawl 20 can engage. The pawl 21 is mounted on the backrest side part Ra so as to be pivotable about a pivot axis C, and the locking disk 20 is fixed to the side part S2. In order to release locking of the blocking device 2, the pawl 21 can be pivoted from an engagement position, in which the pawl 21 is connected in positively locking fashion to the locking disk 20, into a release position, in which the pawl 21 does not engage into the locking disk 20. In the engagement position, the pawl 21 engages into a circumferentially provided locking opening 200 of the locking disk 20, which locking opening is illustrated in FIGS. 2A and 2B. In the engagement position, the backrest side part Rb and thus the backrest R is thus secured relative to the side part S2, such that the backrest R cannot be displaced beyond a usage position in the comfort range. By contrast, if the locking has been released and the pawl 21 is not in engagement with the locking disk 20, the backrest side part Rb by means of which the pawl 21 is pivotably mounted, and thus the backrest R, can be pivoted about the backrest pivot axis D relative to the side part S2 of the seat subframe U even beyond the comfort range.

For the pivotable mounting on the (left-hand) side part S2 of the seat subframe U, the backrest side part Rb without a fitting is mounted rotatably on a rotary bearing part in the form of a rotary bearing journal 3. The rotary bearing journal 3, which in the present case is of hollow form, is held in a central passage opening 201, running concentrically with respect to backrest pivot axis D, of the locking disk 20. The rotary bearing journal 3 provides, on the side part S2, the physical axis of rotation for the backrest side part Rb and thus the backrest R.

For the actuation of the blocking device 2 and in particular for the elimination of a blocking action by means of the blocking device 2, in order to be able to transfer the backrest R into a non-use position, the detent fitting 1 is coupled by means of a coupling mechanism 4 to the blocking device 2. Consequently, if the detent fitting 1 is actuated by means of the actuating mechanism 5 in order, at one (the first, right-hand) backrest longitudinal side, to release a locking action between the first backrest side part Ra and the first side part S1 of the seat subframe U, a part of the actuating force imparted for the actuation of the detent fitting 1 is transmitted via the coupling mechanism 4 also as an adjustment force to the blocking device 2, in order to disengage the pawl 21 from the locking disk 20.

As is illustrated in more detail in particular also in the juxtaposition with FIGS. 2A and 2B, the coupling mechanism 4 illustrated by way of example in FIG. 1A may include for example a first rigid coupling member 40 for this purpose. The first coupling member 40 extends between the two backrest side parts Ra and Rb and, upon actuation of the detent fitting 1 by means of the actuating mechanism 5, is rotatable along an adjustment direction V1 (for example about the backrest pivot axis D). The first coupling member 40 is in this case rotationally conjointly connected for example to an inwardly projecting rotary journal of the detent fitting 1 and is rotatably mounted within the passage opening 30 of the rotary bearing journal 3 at the opposite, other backrest longitudinal side. The rotatable coupling member 40 then for example projects slightly out of the passage opening 30 and is connected to a second coupling member 41 of the coupling mechanism 4, which second coupling member connects the first coupling member 40 to the pawl 21. In this way, by rotating the coupling member 40, a pulling action can be exerted on the pawl 21 in order to disengage the latter from the locking disk 20.

The second coupling member 41 may for example be a flexible traction mechanism, such as for example a Bowden cable or a cable pull. This flexible traction mechanism is, in the event of rotation of the rigid coupling member 40, displaced along an adjustment direction V2. By virtue of this traction mechanism of the second coupling member 41 engaging on a coupling portion 211 of the pawl 21 that is mounted so as to be pivotable about a pivot axis C, the pawl 21 is hereby likewise displaced, specifically is pivoted about its pivot axis C along an adjustment direction V3 (clockwise in FIGS. 2A and 2B). By means of the coupling mechanism 4, a mechanical connection is thus produced between the detent fitting 1 at one, the first, backrest longitudinal side and the blocking device 2, which serves as crash safety means, at the other backrest longitudinal side, such that an actuation of the detent fitting 1 is always also associated with an actuation of the blocking device 2.

For the locking of the backrest R to the seat subframe U by means of the blocking device 2 with crash safety, the pawl 21 furthermore may include, in the present case, a detent hook 210 which engages in positive locking fashion into the locking opening 200 at the outer edge of the locking disk 20 when the detent fitting 1 is not actuated. The dimensions of the locking opening 200 on the locking disk 20 are dimensioned such that the pawl 21 can engage into the locking opening when the backrest R is in adjustment positions within the comfort range. Radially extending and mutually opposite edges 200a and 200b of the locking opening 200 thus predefine the two outermost adjustment positions within the comfort range, at which locking of the backrest R remains possible by means of the blocking device 2. An angle $\alpha$ spanned between the two edges 200a and 200b with respect to the backrest pivot axis D as apex thus corresponds to the maximum permitted pivot angle of the backrest R within the comfort range. If the backrest R—in the case of an actuated detent fitting 1 and unlocked blocking device 2—is pivoted forward (or rearward) about the backrest pivot axis D beyond the comfort range, an engagement of the pawl 21 into the locking disk 20 is prevented, and no locking is possible. In this way, the blocking device 2 in particular does not oppose a folding-forward of the backrest R into a load compartment position.

Figure 4A:
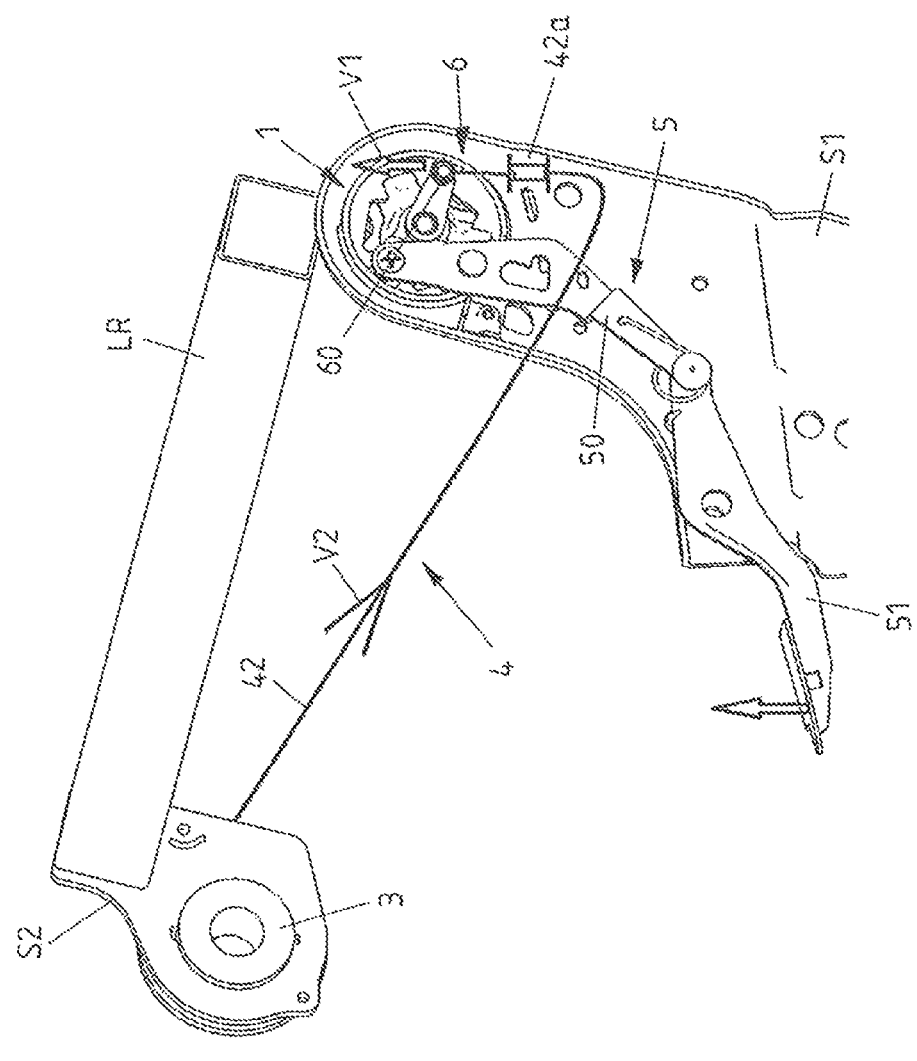
Figure 5:
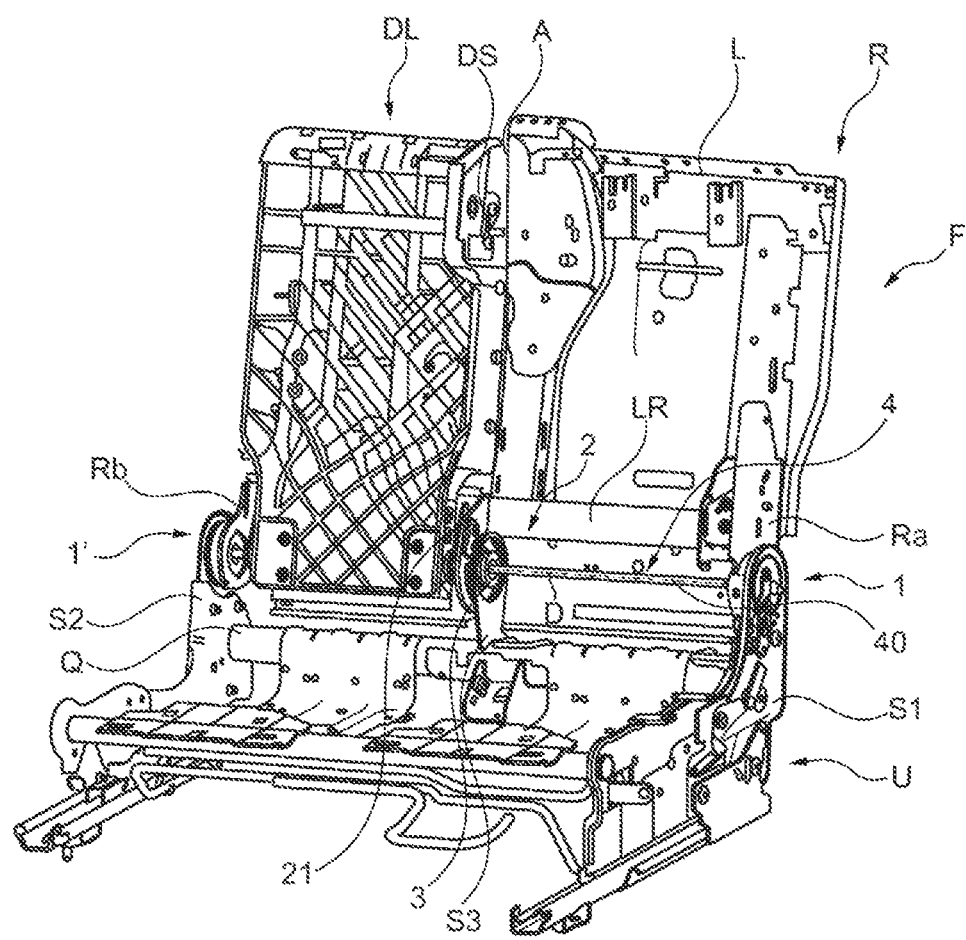
FIGS. 5-7A show, in different views, a further design variant of a proposed vehicle seat, in which a backrest is pivotably held and arrestable on a seat subframe by means of two detent fittings provided at opposite backrest longitudinal sides, and an additional blocking device for the crash situation is provided between the two backrest longitudinal sides.
Figure 6:
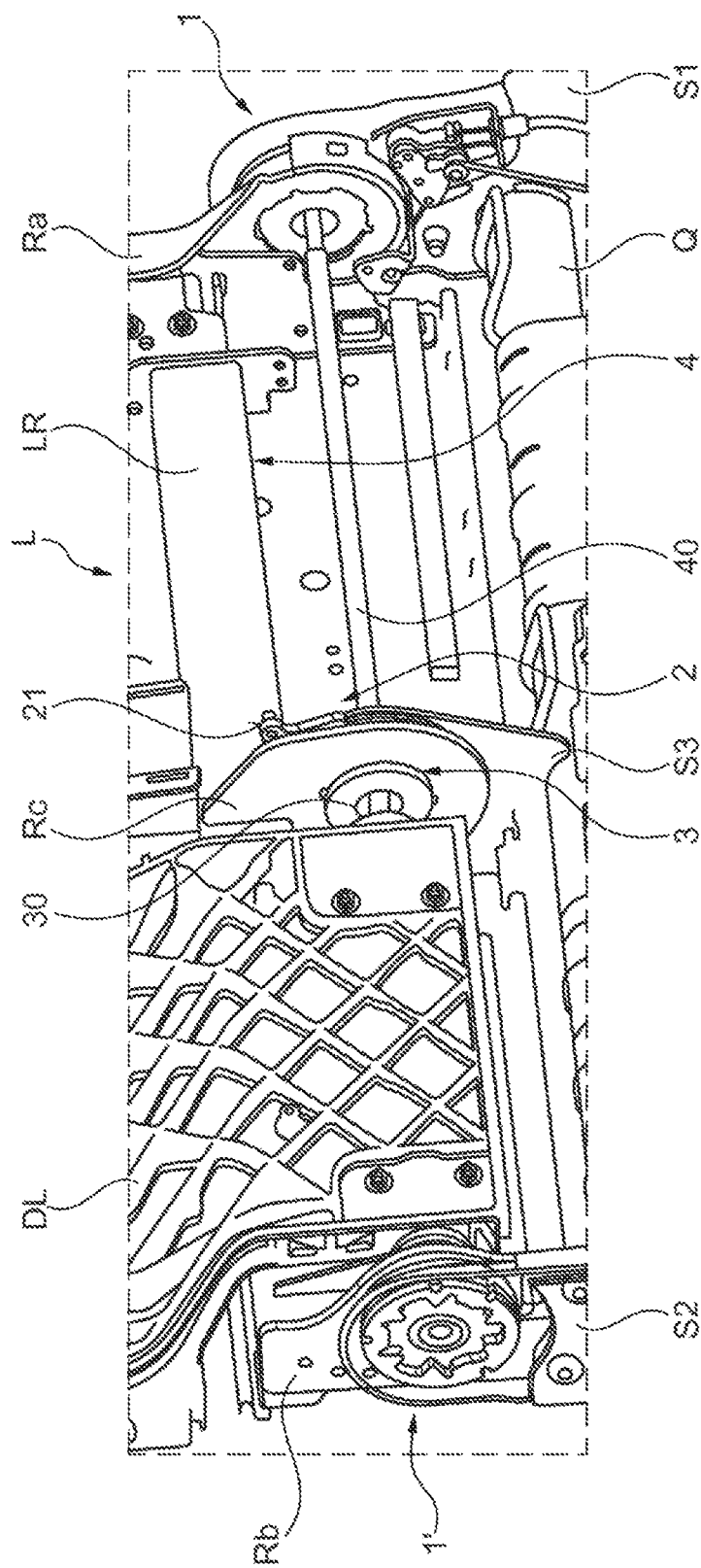
Figure 6A:
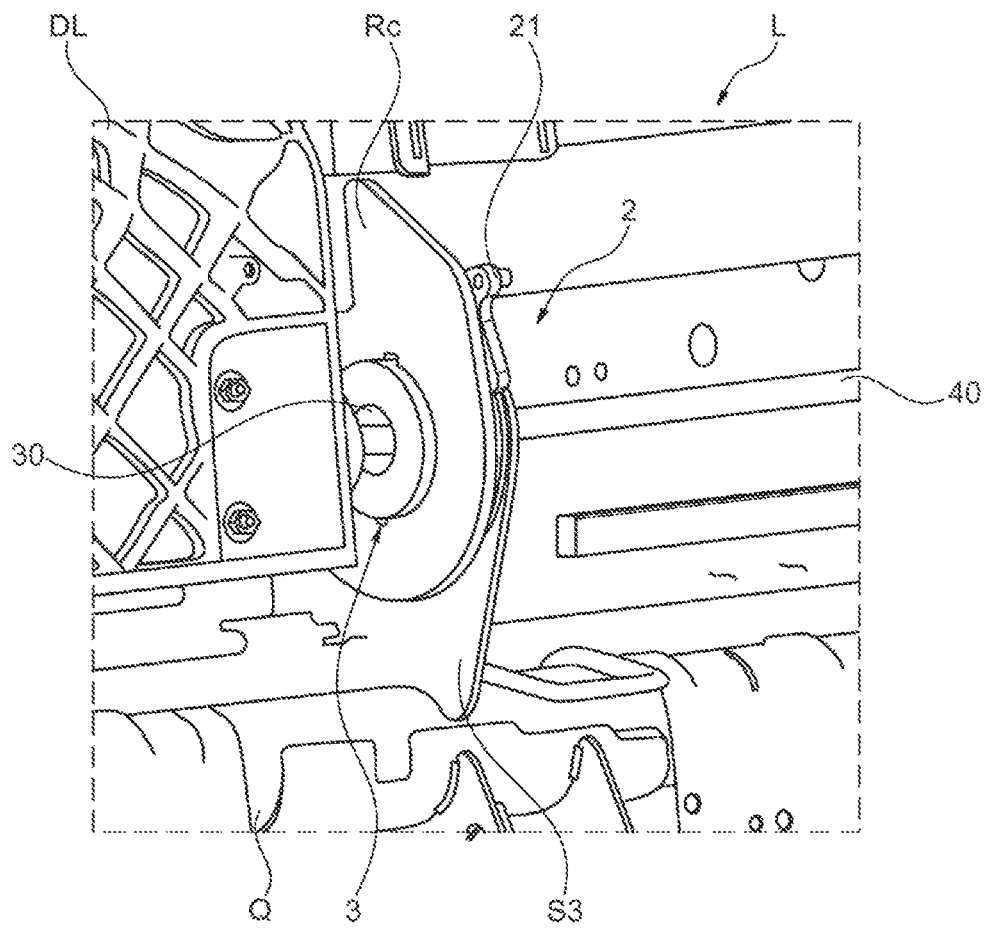
Figure 7:
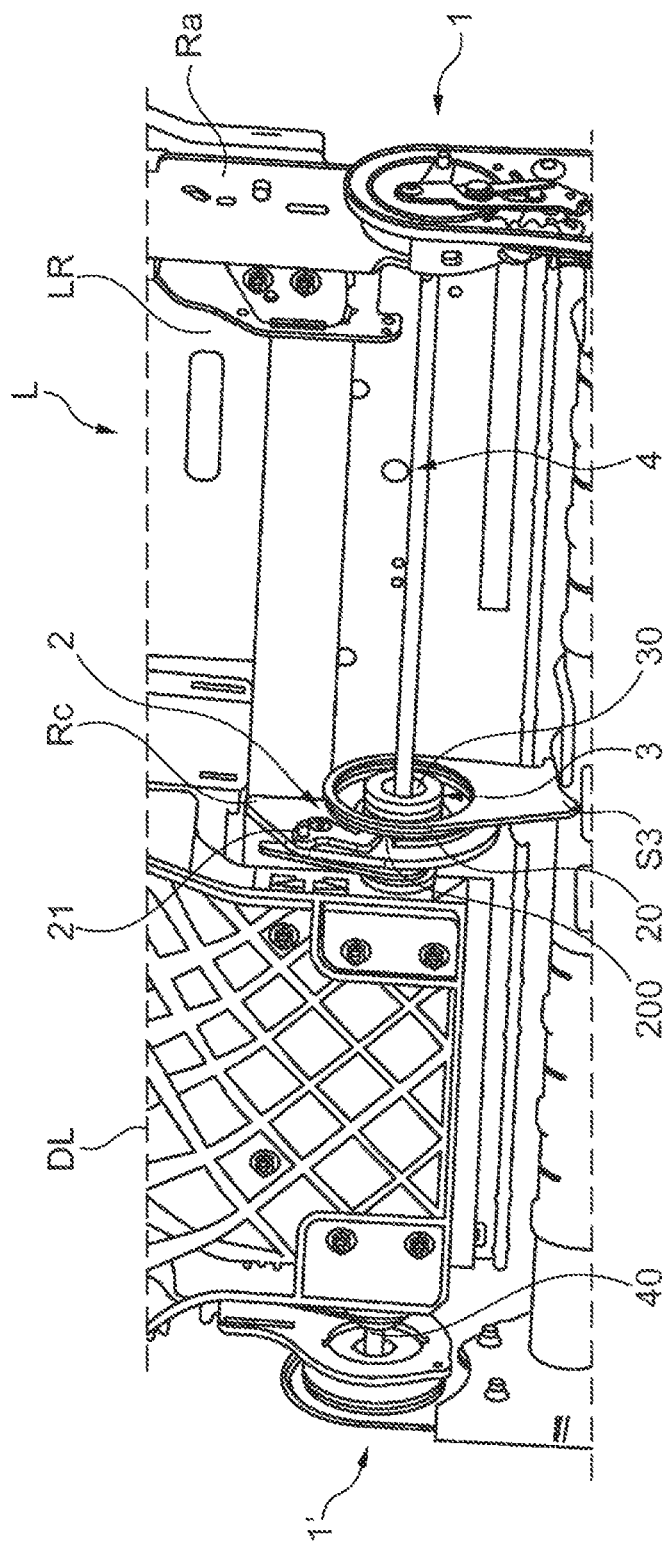
Figure 7A:
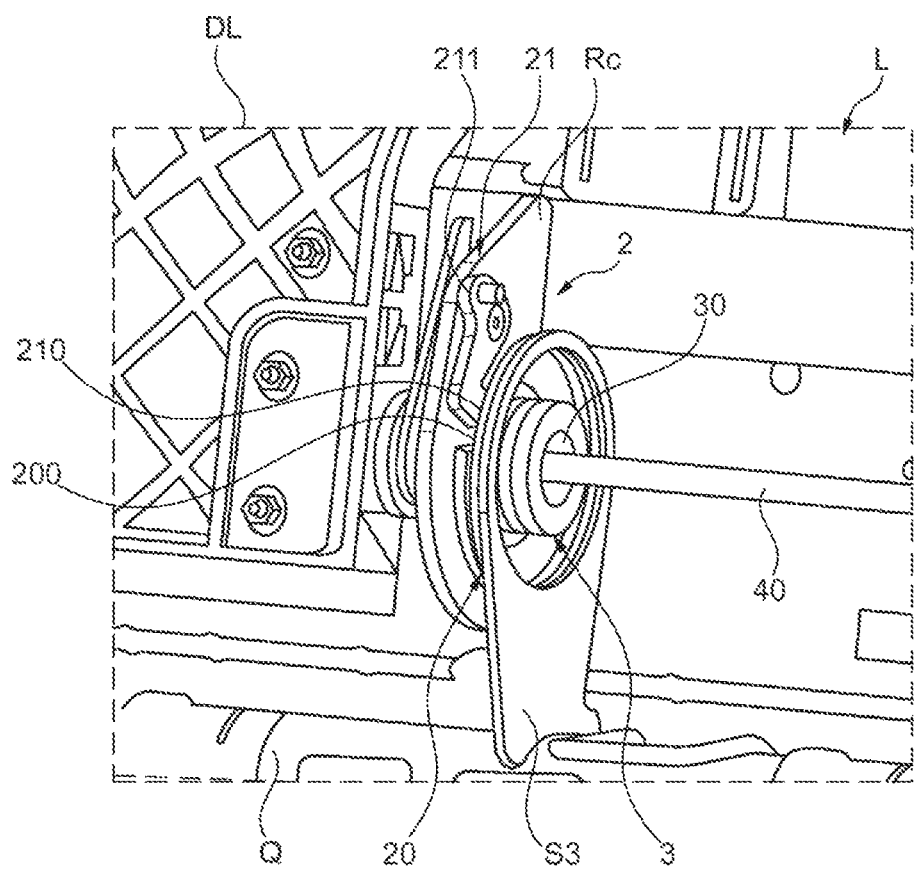

As an alternative to a first coupling member 40, for example in the form of a rigid coupling shaft, which is mounted rotatably for the transmission of an adjustment force to the blocking device 2, it is also possible for a flexible traction mechanism, in particular a cable pull, to extend between the detent fitting 1 and the blocking device 2. Here, the flexible traction mechanism may in particular likewise be led through the passage opening 30 of the rotary bearing journal 3 and consequently extend through the rotary bearing journal 3. This is self-evidently not imperative, as illustrated by way of example in FIGS. 3, 4A and 4B.

Here, FIG. 3 firstly illustrates the actuating mechanism 5 once again in detail in a side view. In the present case, the actuating mechanism 5 may include an actuating lever 51 for manual actuation by a user. The actuating lever 51 is mounted pivotably on the side part S1 and is connected in articulated fashion to a transmission lever 50. The transmission lever 50 is articulated on a lever element of the detent fitting 1, such that, when a pulling action is exerted on the actuating lever 51, detent elements of the detent fitting 1 are disengaged, and thus the backrest R is pivotable relative to the seat subframe U. Furthermore, a release lever 60 is coupled to the lever element of the detent fitting 1 such that the release lever 60 is likewise pivoted upon actuation of the actuating mechanism 5 and in particular upon the pulling action being exerted on the actuating lever 51.

In the present case, a Bowden cable 42 engages on a radially projecting coupling portion 60 of the release lever 6. During the pivoting of the release lever 6 in an adjustment direction V1, a tensile force acting along an adjustment direction V2 is introduced into the Bowden cable 42. The Bowden cable 42 extends to the other backrest longitudinal side and engages by way of its core on the coupling portion 211 of the pawl 21. Owing to the tensile force introduced as a result of the pivoting of the release lever 6, a pulling action is consequently exerted on the pawl 21 of the blocking device 2 at the opposite backrest longitudinal side, and the pawl 21 is disengaged from the locking disk 20 along the adjustment direction V3. The coupling mechanism 4 illustrated here consequently has only the Bowden cable 42 for mechanically coupling the detent fitting 1 and the blocking device 2 at the different backrest longitudinal sides to one another.

By way of example, a Bowden sheath of the Bowden cable 42 is supported on a Bowden support 42a on the side part S1 of the seat subframe U and on a structure support 42b on the backrest side part Rb of the opposite backrest longitudinal side, in order to transmit the tensile force via the core of the Bowden cable 42 to the pawl 21.

The pawl 21 may be elastically preloaded into its engagement position by means of a spring element, for example a leg spring, such that, upon the ending of an actuation and of an actuating force thus introduced via the actuating mechanism 5, in order to pivotably hold the backrest R, the pawl 21 automatically locks again with the locking disk 20 (if the backrest R is present in the comfort range).

Instead of an actuating mechanism 5 for a manual actuation, it is self-evidently possible for provision to be made for an actuation by external force, for example by means of an actuator, and likewise for kinematics for the actuation of the blocking device 2 which are dependent on the adjustment position of the backrest R. For this purpose, corresponding guide slots are provided on the side part S1 at the backrest longitudinal side which has the detent fitting 1. The coupling mechanism 4 may furthermore also include parts of a linkage, corresponding to the levers 50, 51 of the actuating mechanism 5.

FIGS. 5 to 7A show, in various views, a further design variant of a proposed vehicle seat F, in the case of which, by contrast to the vehicle seat F of FIGS. 1A to 4B, a further fitting arrangement in the form of a further detent fitting 1' is provided at the second (left-hand) backrest longitudinal side. The backrest R of the vehicle seat F of FIGS. 5 to 7A can thus, by means of two detent fittings 1 and 1' provided at opposite backrest longitudinal sides, be arrested in the illustrated use position and adjusted in terms of its inclination relative to the seat subframe U within a defined comfort range. In addition to the backrest part L, the backrest R of FIGS. 5 to 7A also has a separately pivotable through-loading facility DL. The through-loading facility DL is, in the use position illustrated, locked to the backrest part L by means of a through-loading facility lock DS. When the locking at the by means of through-loading facility lock DS is released, the through-loading facility DL can be pivoted relative to the backrest part L in order to open up the aperture A.

The vehicle seat F of FIGS. 5 to 7A also has an additional blocking device 2, by means of which, in a crash situation, the backrest R is secured against pivoting about the backrest pivot axis D beyond the comfort range and which is coupled to the detent fitting 1 at one (the first, right-hand) backrest longitudinal side. The blocking device 2 is provided approximately centrally between the two backrest longitudinal sides. The locking disk 20 of the blocking device 2 is in this case provided on a central part S3 which is fixed with respect to the seat subframe, whereas the pawl 21 of the blocking device 2 is provided on a backrest part Rc fixed with respect to the backrest. The pawl 21 is, analogously to the vehicle seat F of FIGS. 1A to 4B, mounted so as to be pivotable in order, upon actuation of the detent fitting 1, to be pivoted out of a locking position so as to thus not block a pivoting movement of the backrest R beyond the comfort range.

The rotary bearing journal 30 provided with the passage opening 30 is arranged on the central part S3 fixed with respect to the seat subframe. Here, in the present case, a coupling shaft 40 extends through the passage opening 30, by means of which coupling shaft the two detent fittings 1 and 1' are mechanically coupled and which coupling shaft is furthermore also part of the coupling mechanism 4. The coupling shaft 40 thus firstly serves, upon actuation of one detent fitting 1, to transmit an adjustment force to the opposite detent fitting 1' in order to likewise actuate the latter and to permit pivoting of the backrest R and thus of the backrest part L with the through-loading facility DL locked thereto and to enable the inclination of the backrest R to be adjusted. Secondly, upon actuation of the detent fitting 1 (or upon actuation of the detent fitting 1'), it is also possible for an adjustment force to be transmitted via the coupling shaft 40 to the blocking device 2, such that, in the event of arresting of the backrest R being released by means of the detent fittings 1 and 1', the locking provided by means of the blocking device 2 is likewise released.

By means of the blocking device 2 additionally provided between the two backrest longitudinal sides, the backrest R is secured against pivoting out of the comfort range in the crash situation, such that forces that act in the crash situation do not have to be accommodated via the two detent fittings 1 and 1' alone in order to secure the backrest R against pivoting. The detent fittings 1 and 1' can thus be designed primarily for the loads that arise during normal use, and consequently undersized with regard to the forces that act in the crash situation. This means that the detent fittings 1 and 1' are not designed as the sole means for securing the backrest R in the crash situation and can thus be made more expensive, because the additionally provided blocking device 2 acts in the crash situation and—in combination with the detent fittings 1 and 1'—secures the backrest R to the seat subframe U.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE DESIGNATIONS 1, 1' Detent fitting (fitting arrangement)
2 Blocking device
20 Locking disk (locking element)
200 Locking opening
200a, 200b Edge
201 Passage opening
21 Pawl (blocking element)
210 Detent hook
211 Coupling portion
3 Rotary bearing journal (rotary bearing part)
30 Passage opening
4 Coupling mechanism
40 (First) coupling member/coupling shaft
41 (Second) coupling member
42 Bowden cable (traction mechanism)
42a, 42b Bowden support
5 Actuating mechanism
50 Transmitting lever
51 Actuating lever
6 Release lever
60 Coupling portion
A Aperture
C Pivot axis
D Backrest pivot axis
DL Through-loading facility
DS Through-loading facility lock
F Vehicle seat
L Backrest part
LR Backrest frame tube
Q Transverse tube
R Backrest
Ra, Rb Backrest side part
Rc Backrest part
S1, S2 Side part
S3 Central part
U Seat subframe
V1, V2, V3 Adjusting direction
α Angle

The invention claimed is:

1. A vehicle seat comprising:
a seat subframe;
a backrest configured to be mounted to and pivotable relative to the seat subframe about a backrest pivot axis, wherein the backrest is configured to be adjusted in a comfort range;
a fitting arrangement disposed on a first longitudinal side of the backrest and configured to lock the backrest in an adjustment position in the comfort range and to adjust the backrest; and
a blocking device on either the first longitudinal side or a second longitudinal side of the backrest, opposing the first longitudinal side, wherein in a crash situation, the blocking device is configured to block the backrest from pivoting about the backrest pivot axis beyond the comfort range, and wherein the blocking device is coupled to the fitting arrangement such that as the backrest is adjusted beyond the comfort range, the blocking device is actuated and a locking action provided by the blocking device is released, wherein the blocking device is disposed on a second backrest longitudinal side of the backrest.

2. The vehicle seat of claim 1, wherein the blocking device includes a blocking element and a locking element, wherein the blocking element is adjustably mounted so that when the backrest is in the comfort range, the blocking element blocks the backrest, and wherein the locking element is configured to lock the blocking element.

3. The vehicle seat of claim 2, wherein actuation of the fitting arrangement moves the blocking element so that as the backrest is adjusted the blocking element does not engage the locking element.

4. The vehicle seat of claim 3, wherein the blocking element does not engage the locking element when the backrest is pivoted to an adjustment position outside of the comfort range.

5. The vehicle seat of claim 4, wherein the locking element forms a locking opening, wherein the blocking element only engages the locking opening when the backrest is in the comfort range.

6. The vehicle seat of claim 1, wherein the fitting arrangement is configured to adjust the backrest in the comfort range and beyond the comfort range.

7. The vehicle seat of claim 1, further comprising a coupling mechanism configured to couple the fitting arrangement to the blocking device and transmit an actuating force, for actuation of the fitting arrangement, at least partially as an adjustment force to the blocking device in order to release the blocking device.

8. The vehicle seat of claim 7, wherein the coupling mechanism includes at least one flexible traction mechanism configured to transmit the adjustment force.

9. The vehicle seat of claim 8, wherein the at least one flexible traction mechanism engages the adjustably mounted blocking element.

10. The vehicle seat of claim 1, further comprising an actuating mechanism and an adjustably mounted release lever, wherein the actuating mechanism is coupled to the adjustably mounted release lever and configured to actuate the fitting arrangement, and wherein adjustment of the release lever actuates the blocking device.

11. A vehicle seat comprising:
a seat subframe;
a backrest configured to be mounted to and pivotable relative to the seat subframe about a backrest pivot axis, wherein the backrest is configured to be adjusted in a comfort range;
a fitting arrangement disposed on a first longitudinal side of the backrest and configured to lock the backrest in an adjustment position in the comfort range and to adjust the backrest; and
a blocking device on either the first longitudinal side or a second longitudinal side of the backrest, opposing the first longitudinal side, wherein in a crash situation, the blocking device is configured to block the backrest from pivoting about the backrest pivot axis beyond the comfort range, and wherein the blocking device is coupled to the fitting arrangement such that as the backrest is adjusted beyond the comfort range, the blocking device is actuated and a locking action provided by the blocking device is released, wherein the blocking device includes a blocking element and a locking element, wherein the blocking element is adjustably mounted so that when the backrest is in the comfort range, the blocking element blocks the backrest, wherein the locking element is configured to lock the blocking element, and wherein the blocking element is adjustably mounted on the backrest and the locking element is fixed to the seat subframe.

12. A vehicle seat comprising:
a seat subframe;
a backrest configured to be mounted to and pivotable relative to the seat subframe about a backrest pivot axis, wherein the backrest is configured to be adjusted in a comfort range;
a fitting arrangement disposed on a first longitudinal side of the backrest and configured to lock the backrest in an adjustment position in the comfort range and to adjust the backrest; and
a blocking device on either the first longitudinal side or a second longitudinal side of the backrest, opposing the first longitudinal side, wherein in a crash situation, the blocking device is configured to block the backrest from pivoting about the backrest pivot axis beyond the comfort range, and wherein the blocking device is coupled to the fitting arrangement such that as the backrest is adjusted beyond the comfort range, the blocking device is actuated and a locking action provided by the blocking device is released;
a coupling mechanism configured to couple the fitting arrangement to the blocking device and transmit an actuating force, for actuation of the fitting arrangement, at least partially as an adjustment force to the blocking device in order to release the blocking device, wherein the coupling mechanism includes at least one flexible traction mechanism configured to transmit the adjustment force; and
a rotary bearing part disposed on and pivotably connecting the backrest to the seat subframe, wherein the flexible traction mechanism extends through the rotary bearing part.

13. The vehicle seat of claim 12, wherein the rotary bearing part is held in a passage opening formed by the locking element.

14. The vehicle seat of claim 12, wherein the rotary bearing part includes a hollow rotary bearing journal.

15. A vehicle seat comprising:
a seat subframe including a central part forming a locking opening provided with an edge;
a backrest including
a backrest part configured to pivot relative to the seat subframe in a comfort range and including a first side part and a second side part,
a through-loading facility having a third side part;
a first fitting arrangement pivotally connecting the first side part to the seat subframe;
a second fitting arrangement pivotally connecting the third side part to the seat subframe and operatively connected to the first fitting arrangement;
a pawl disposed on the second side part and configured to move between a deployed state and a retracted state, wherein when the pawl is in the deployed state, the pawl engages the edge of the locking opening to prevent the backrest part from pivoting beyond the comfort range, wherein when the pawl is in the retracted state, the backrest part is free to move beyond the comfort range; and
a cable disposed between the pawl and the first fitting arrangement and/or the second fitting arrangement, wherein as the first fitting arrangement or the second fitting arrangement are actuated, the cable moves the pawl from the deployed state to the retracted state.

16. A vehicle seat comprising:
a seat subframe;
a backrest configured to be mounted to and pivotable relative to the seat subframe about a backrest pivot axis, wherein the backrest is configured to be adjusted in a comfort range;
a fitting arrangement disposed on a first longitudinal side of the backrest and configured to lock the backrest in an adjustment position in the comfort range and to adjust the backrest;

a second fitting arrangement provided on a second longitudinal side of the backrest, wherein the second fitting arrangement is configured to lock the backrest in an adjustment position in the comfort range, wherein the first and second fitting arrangements are each actuatable in order to adjust the backrest; and a blocking device on the second longitudinal side of the backrest, wherein in a crash situation, the blocking device is configured to block the backrest from pivoting about the backrest pivot axis beyond the comfort range, and wherein the blocking device is coupled to the fitting arrangement such that as the backrest is adjusted beyond the comfort range, the blocking device is actuated and a locking action provided by the blocking device is released.

17. The vehicle seat of claim 16, wherein a blocking element of the blocking device is provided between the first and second longitudinal sides of the backrest and is pivotally mounted on a backrest part, and wherein a locking element is provided on a central part of the seat subframe.

18. The vehicle seat of claim 17, further comprising a coupling member mechanically coupling the first and second fitting arrangements to one another, wherein the coupling member is configured to transmit an actuating force to actuate the first fitting arrangement and at least partially transmitting another adjustment force to actuate the second fitting arrangement to release the blocking device.

* * * * *